May 18, 1937.    G. WALL    2,081,046
ALTERNATING ELECTRIC CURRENT INDUCTION METER
Filed April 10, 1935    2 Sheets-Sheet 1
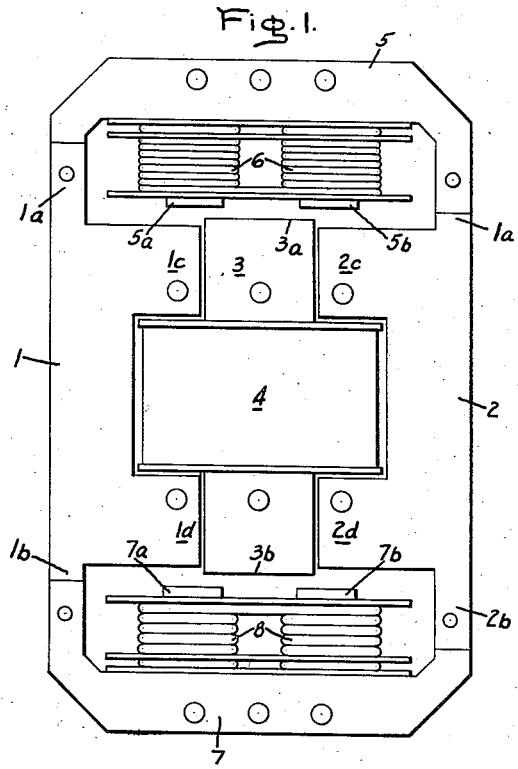
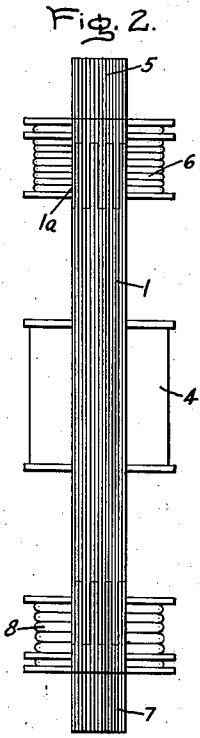
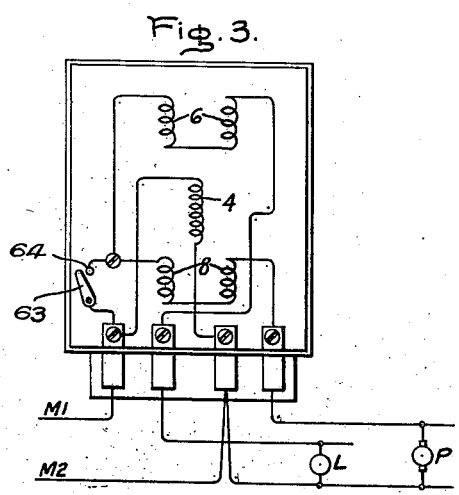
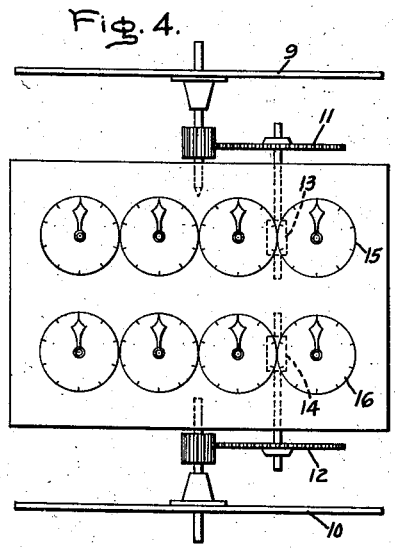
Inventor:
George Wall,
by Harry E. Dunham
His Attorney.

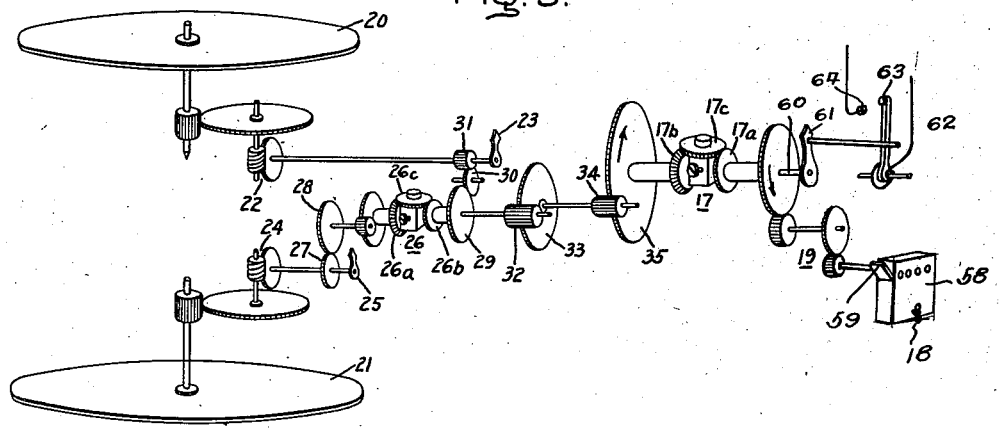
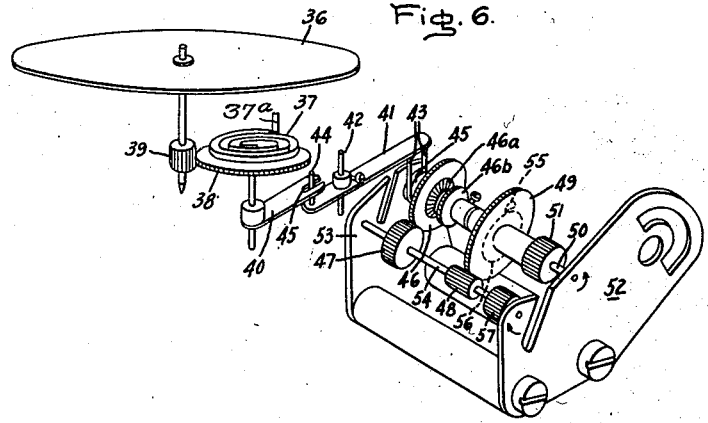

Patented May 18, 1937

2,081,046

UNITED STATES PATENT OFFICE 2,081,046

ALTERNATING ELECTRIC CURRENT INDUCTION METER

George Wall, Manchester, England, assignor to General Electric Company, a corporation of New York Application April 10, 1935, Serial No. 15,674
In Great Britain April 17, 1934

6 Claims. (Cl. 171—34)

My invention relates to meters and integrating devices and concerns particularly electrical watt-hour meters, and alternating-current induction relays and instruments, which will be referred to inclusively as meters. Integrating meters which change their rate when the integrated quantity exceeds a predetermined value are claimed in my copending application, Serial No. 73,098, filed April 7, 1936.

One of the objects of my invention is to provide an electrical device having two independent induction motor units with a single magnetic field structure, each motor unit including a series and a shunt electric magnetic system acting upon a rotatable element.

In watt meters for instance of this kind the magnetic fluxes of the series systems are produced by current windings in series with the load, the power taken by which it is desired to measure, while the magnetic fluxes of the shunt system are produced by voltage windings connected across the supply mains. Hitherto it has been usual to provide a separate voltage winding for each current winding or system, and it is an object of this invention to provide meters of the kind referred to having a simplified construction.

According to the present invention, in its preferred form, a single shunt winding common to both the electromagnetic systems is provided, the magnetic core of which is so shaped and arranged with respect to the magnetic cores of each of two current windings that the magnetic flux due to one pole of the shunt winding core combines with the magnetic flux due to one current winding to act upon one rotor element, and the flux due to the other pole of the shunt winding core combines with the flux due to the other current winding to act upon the other rotor element.

In one practical form of the invention the shunt winding is wound on a straight core located between the two cores of the current windings which are formed as pairs of projections from opposite sides of a rectangular magnetic system. This system provides a path for the shunt flux and other projections from the rectangular system cooperate with sides thereof to provide paths for the shunt magnetic flux. The two rotatable members of the induction motors are located in gaps between the ends of the shunt winding core and the ends of the current winding cores.

The invention will be better understood from the following description taken in conjunction with the accompanying drawings in which Fig. 1 is a front view of a meter motor element for a single phase two-circuit meter, the meter rotors being omitted for clearness.

Fig. 2 is a side view of the meter motor element of Fig. 1.

Fig. 3 is a circuit diagram showing the connections of the various windings of the meter for a house supply for instance, having two distinct circuits, one for the system through which lighting current is supplied and one for the system through which heavy current is supplied and usually called the power system or circuit.

Fig. 4 is a view of the two separate registering mechanisms, one being driven by the meter rotor, in the lighting circuit and the other by the meter rotor in the power circuit.

Figs. 5 and 6 show two applications of the invention and will be referred to more in detail hereinafter.

Referring now to Figs. 1 and 2 of the drawings, the magnetic circuits of the current windings comprise two U-shaped members 1, 2 constructed of laminations, the yokes of which are provided with projections 1a, 1b, 2a, 2b, respectively, on either side. The limbs 1c, 1d and 2c, 2d of the two vertical members are located opposite to each other as shown and a straight central core 3 is located between the limbs as shown. The core 3 is supported by cross-pieces of non-magnetic material running from limb to limb and carries the voltage winding 4 wound thereon so that the said winding is located in the internal space formed by the four limbs 1c, 1d, 2c, 2d. The two upper projections 1a, 2a are connected by a U-shaped cross-piece 5, also laminated, and the limbs of which are interleaved with the projections 1a, 2a in the usual manner and secured thereto. The yoke of the cross-piece 5 is provided with two internal perpendicular straight cores 5a, 5b on which are mounted in the usual manner two current coils 6 connected in series so as to form one current winding. A similar cross-piece 7 is provided to connect the two lower projections 1b, 2b and is likewise provided with two straight cores 7a, 7b on which are mounted the coils comprising the other current winding 8. The U-shaped cross-pieces 5 and 7 are so mounted that the ends of the perependicular cores 5a, 5b, 7a, 7b are directed towards the respective end of the core 3 so as to leave an air gap of the desired width between the end of the central core 3 and the ends of the cores 5a, 5b or 7a, 7b. It will be seen that the limbs 1c and 1d, 2c and 2d form projections on the sides 1, 2 respectively of the rectangular frame 1, 5, 2, 7 and cooperate with the said sides 1, 2 to provide a path for the shunt magnetic flux.

In each of the gaps formed one of the rotor elements (not shown) of the meter is located in the well known manner. Then the flux due to current flowing in the current winding 6 and that due to the upper pole 3a of the voltage winding core 3 are effective in causing rotation of the rotor element located in the upper air gap and the flux due to current flowing in the current winding 8 and that due to the lower pole 3b of the voltage winding core are effective in causing rotation of the rotor element located in the lower air gap.

Although the magnetic system of the current and shunt windings has been described hereinbefore as laminated, each lamination comprising four U-shaped members, other constructions are possible, as for instance a lamination comprising a single member, a stamping for example, having the same shape as the lamination of the assembled magnetic system comprising the four separate members. When a lamination is so constructed in one piece a number of lubricated joints are avoided in the final assembly of the system.

In Fig. 3 like references are used to indicate parts corresponding to those in Figs. 1 and 2. The supply mains are indicated at M1, and M2 and it will be observed that the voltage coil 4 is connected across the mains. The lighting circuit is indicated at L and if the connections be traced, it will be found that the windings 6 are in series with the load L on the lighting circuit. In like manner, the winding 8 will be found to be in series with the load P, on the power circuit.

Fig. 4 illustrates the application of the meter motor as hereinbefore described to a two-circuit electricity meter for registering quarterly consumption of power and light, for instance, in systems in which different rates are charged for power and light. The rotor elements are indicated at 9 and 10, the rotor 9 being located in the air gap between the poles 5a, 5b and 3a (Fig. 1) and the rotor 10 in the air gap between the poles 7a, 7b and 3b (Fig. 1). Each rotor element 9, 10 is connected through a gear wheel 11 and worm 13 or wheel 12 and worm 14 to its respective integrating or counting mechanism in the usual manner and suitably located one above the other as indicated. Each rotor element is furthermore provided with the usual brake magnet and adjusting devices for speed inductive load and low load. These are omitted from the drawings for the sake of clearness. The lighting circuit and power circuit are connected respectively through the windings 6 and 8 of the meter motor mechanism, as illustrated in Fig. 3, and the upper registering device 15 shown in Fig. 4, then registers the consumption of power in the light circuit and the lower registering device 16 registers the consumption of power in the power circuit.

Fig. 5 illustrates the meter motor hereinbefore described incorporated in a two-circuit prepayment meter. In meters of this kind the supply switch or other device governing the supply of power or other commodity is actuated through a prepayment mechanism which may take various forms but in one commonly used form it includes a differential and has two operable members which may be referred to as the commodity or consumption responsive member and the crediting member. In the present case the differential is illustrated as an epicyclic differential mechanism 17. One operable member, the coin crediting member, is the sun wheel 17a, which drives the differential 17 in a direction tending to close the supply switch, and the other operable member, the commodity or consumption-responsive member, is the sun wheel 17b which drives the differential 17 in a direction tending to open the supply switch.

The commodity or consumption side of the prepayment mechanism is represented by the sun wheel 17b, which is driven at a speed proportional to the rate of consumption of a metered quantity or at a speed proportional to the rate at which the credit for the metered quantity is consumed in the case of variable unit prices for the quantity.

The coin or crediting side of the prepayment mechanism is represented by the gears 19 driving the crediting member, the sun wheel 17a of the differential 17. The gears 19 are driven manually by a knob 18 through a coin box 58 containing suitable mechanism permitting the knob 18 to be rotated according to the number of coins of a given denomination deposited in the coin chute 59. A shaft 60 fastened to the planetary cage 17c carries a pointer 61 with a stop pin 62 and a movable contact 63 spring biased toward the pin 62 to cooperate with a stationary contact 64 and control the load circuit. Inasmuch as the pointer 61 rotates clockwise (viewed from the right of the drawing) under the influence of the meter rotor and counterclockwise under the influence of the coin knob 18, the position of the pointer indicates the number of coins deposited in advance payment and, when electricity consumption continues without any coins in advance payment, the pin 62 strikes the arm of the movable contact 63, opening contacts 63—64, and prevents the use of electricity until a coin has been deposited.

Referring to Fig. 3, it will be seen that, in the arrangement which I have shown for the sake of illustration, the contacts 63 and 64 of the prepayment mechanism are connected in the main circuit M1, M2 which is branched beyond the contacts 63 and 64 to form the separate light and power circuits L and P, respectively. However, it will be understood that my invention is not limited to this specific arrangement but obviously includes providing the prepayment mechanism with a plurality of pairs of contacts for controlling different circuits independently.

In the case of a two-circuit meter, there are two meter rotors, as hereinbefore explained, for instance, one for the power circuit and the other for the light circuit. In Fig. 5, the meter rotor of the light circuit is indicated at 20, and that of the power circuit at 21. It will be understood that the rotor 20 is located between the poles 5a, 5b and 3a and the rotor 21 is located between poles 7a, 7b and 3b so as to be acted upon by the respective current or series windings 6, 8. It will furthermore be understood that the usual brake magnets and adjusting devices for speed inductive load and low load are provided. The two rotors 20, 21 are geared to registering devices as described in reference to Fig. 4. The rotor 20 is geared through a gear train 22 to the registering device indicated at 23. The rotor 21 is geared through a gear train 24 to the registering device indicated at 25. The effects of the two rotors 20, 21 on the meter differential 17 are added together by means of an adding differential gear 26 in the known manner, said differential gear 26 being inserted between the said two rotors and the commodity or consumption side 17b of the meter differential 17. One sun wheel 26a of the differential 26 is geared to the rotor 21, and the other sun wheel 26b is geared to the rotor 20 and the shaft carrying the planetary cage 26c is geared to the commodity or consumption side 17b of the meter differential 17. Gear wheels 27, 28 having the appropriate velocity ratio are inserted between the rotor 21 and the sun wheel 26a of the differential 26 and gear wheels 29, 30, 31 having the appropriate velocity ratio are inserted between the rotor 20 and the sun wheel 26b of the differential 26. The velocity ratio between the two sets of gears 27, 28 and 29, 30, 31 is the same as the ratio of the price per unit for power to the price per unit for light. These gears may be changed to suit varying circumstances, as for instance changes in the rates charged for light or power. Obviously, the number of revolutions of the shaft carrying the sun wheel 26a represents the amount of money due for the power consumed and the number of revolutions of the shaft carrying the sun wheel 26b represents the amount due for electric light consumed. Other change speed gears 32, 33 and 34, 35 may be inserted between the differential 26 and the sun wheel 17b of the meter differential 17 and may be changed to adapt the meter for use with different denomination coins. Although I have illustrated my invention as applied to two-circuit metering of electric light and power, it will be understood that my invention is not limited thereto but, obviously, includes obtaining a combined registration of the total amount due for any two different quantities or commodities which may be metered by rotating meters or for similar quantities or commodities applied in a plurality of separate circuits, pipes, channels, or the like, as well as adapting a prepayment meter for controlling the supply of a plurality of quantities at the same or different prices per unit. In the description and claims, I have used the word "circuits" to refer inclusively to both electrical circuits and circuits or paths for gases, liquids, and other substances flowing in pipes or channels.

Fig. 6 illustrates the application of the meter motor mechanism to the kind of prepayment meter known as the load rate prepayment meter in which the charge per unit is changed as soon as the instantaneous load or the integrated load demand exceeds a predetermined value. In meters of this kind one metering element only is necessary and one rotor may therefore be used as the actuating element of a relay responding to instantaneous power, average power load demand over time intervals of predetermined length, or some other quantity depending upon the specific construction of the relay. In the Fig. 6 the metering element is not shown as this is well known, but the rotor employed as a relay actuating element is shown as the upper one of two rotors and is indicated by the reference 36. The metering element comprises the lower rotor (not shown) but the positions of the metering element and relay actuating element may obviously be interchanged. A change speed gear is interposed between the meter rotor and the consumption member of the meter differential, the change speed mechanism being operated by the relay when the consumption of the power or current exceeds a predetermined value to bring about a change in the velocity ratio of the change speed gear so that the ratio of the two velocity ratios is the same as the ratio of the price per unit charged for the consumption of power below the predetermined value to the price per unit charged for the consumption above the predetermined value.

In adapting the meter motor of the present invention to meters of this kind according to the specific embodiment illustrated in Fig. 6, the relay rotor, indicated at 36 is controlled by means of a spiral spring 37 so that it is only capable of turning through a limited angle against the force of this spring when acted upon by the current and voltage windings. The rotor 36 is geared to a wheel 38 by the wheel or pinion 39 secured to the rotor shaft, and on the shaft of the wheel 38 is secured the lever 40 of a lever system comprising levers 40, 41. One end of the spring 37 is fixed to a pin 37a secured to the wheel 38 and the other end of the spring is fixed to the shaft on which the wheel 38 is loosely mounted.

The lever 41 is pivoted on a pivot pin 42 mounted in suitable bearings and the lever is provided at one end with a fork member 43 comprising two depending pins. At the other end, the lever 41 is provided with a pin 44 which engages in a slot 45 in the lever 40. The fork member 43 engages with the groove of a sleeve integral with one member in the form of a bevel wheel 46a of a dog clutch 46 and is adapted to slide on the shaft 50 which is mounted in two parallel plates 52, 53. A toothed wheel 45 is integral with the member 46a and meshes with another toothed wheel 47 which is secured to a shaft 54 mounted parallel to the shaft 50 in suitable bearings in the plates 52, 53. A pinion 48 secured to the shaft 54 meshes with a toothed wheel 49 loosely mounted on the shaft 50 and provided with a pawl 55 which engages with a ratchet wheel 56. This wheel 56 is secured to the shaft 50. The second member of the dog clutch also comprises a bevel gear wheel 46b and is secured to the shaft 50. The toothed wheel 51 is secured to the shaft 50 and is adapted to mesh with the commodity side of the meter differential (not shown). The shaft 54 carries a third wheel 57 secured thereto and adapted to mesh with the meter register which is operated in the usual way by the meter rotor. It will be observed that the change speed device hereinbefore described is inserted between the wheels 57 and 51, that is, between the meter rotor and the commodity side of the meter differential.

In the normal position, the clutch members 46a and 46b are out of engagement when the power consumed is below the predetermined amount.

The torque of the spring 37 is adjusted to a predetermined value which corresponds with the torque exerted on the rotor 36 by the current and voltage windings, when the predetermined value of current (and hence the power being consumed) flows through the current windings of the relay. At this value of the power, the torque exerted on the rotor 36 by the windings is able to overcome the torque exerted by the spring 37, and consequently the levers 40, 41 are operated and the member 46a of the dog clutch is brought into engagement with the member 46b.

When the power consumed is below the predetermined value the commodity side of the meter differential is driven through the wheels 57, 48, 49, ratchet wheel 56 and wheel 51, the dog clutch being in these circumstances disengaged. When the clutch is engaged as hereinbefore described the drive of the commodity side of the meter differential is through the wheels 57, 47, 45 and 51, since the clutch member 46b is secured to the shaft 50. The velocity of rotation of the ratchet wheel 56 is now greater than that of the wheel 49 so that the pawl 55 simply slides over the teeth of the wheel 56.

In order to prevent excessive forces acting on the relay rotor 36 due to high loads, which may result in straining of the lever system and clutch mechanism, the relay rotor may be suitably shaped to be cut only by a part of the magnetic flux due to the series and shunt windings.

It will be understood that in a meter of this kind the current windings acting on both rotor elements are connected in the same circuit.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. An electrical device of the induction type comprising in combination a straight core, a pressure winding thereon, a pair of core portions spaced from one end of said straight core to leave an air gap and situated on either side of the center line of said straight core, a current winding on said core portions, a second pair of core portions spaced from the other end of said straight core to leave an air gap and situated on either side of the center line of said straight core, a second current winding on said second core portions, a closed circuit core portion surrounding said core portions, said pairs of core portions being projections from said closed circuit core portion, rotor elements in said air gaps, and means responsive to rotation of said rotor elements.

2. In a prepayment meter for controlling the supply of two quantities to be charged for at different unit-prices, the combination of a pair of shafts, a pair of motors, respectively responsive to said quantities and having connections to said shafts for revolving them, running at speeds proportional in each case to the product of the rate of consumption of a quantity and the unit-price at which the quantity is to be charged for, means for summing up the revolutions of said shafts, and a consumption responsive member driven by said summing means.

3. An electric meter for a pair of parallel alternating-current circuits comprising in combination, a magnetic field structure having a pair of air gaps, induction rotor elements in each of said air gaps, a pressure winding on said field structure inductively cooperating with both of said rotor elements, a current winding associated with one of said electric circuits cooperating inductively with one of said rotor elements, and a second current winding associated with the other of said electric circuits cooperating inductively with the other of said rotor elements.

4. In a prepayment meter, the combination of field structure, a pair of rotor elements cooperating therewith adapted to be rotated according to the rates of consumption of quantities to be charged for at different unit-prices, a differential having a pair of sun wheels and a cage carrying a planetary wheel cooperating with said sun wheels, and gearing connecting said rotor elements each to one of said sun wheels, said gearing having a speed ratio equal to the ratio between the unit-prices at which the two quantities are to be charged.

5. In a prepayment meter for quantities to be charged for at two different unit-prices, a pair of rotor elements responsive to the quantities and field structure cooperating with said rotor elements, a revolvable shaft driven by one of said rotor elements, a second revolvable shaft driven by the other of said rotor elements, the arrangement being such that the ratio between the speeds of said shafts is proportional to the product of the ratio between the unit-prices to be charged for said commodities and the ratio between the rates with which said commodities are consumed, and means for summing up the revolutions of said shafts.

6. In a device for producing a response dependent upon the total charges due for two quantities supplied in separate circuits at different unit prices, the combination of a pair of shafts, a pair of motors operating at speeds proportional respectively to the rates at which said quantities are supplied and having connections with said shafts for revolving them at speeds in each case proportional to the product of the rate of consumption of the quantity and the unit price at which the quantity is to be charged for, and means for summing up the revolutions of said shaft.

GEORGE WALL.